United States Patent [19]

Russell

[11] 4,415,967

[45] Nov. 15, 1983

[54] MULTI-AXIS CONTROLLER

[75] Inventor: Robinson C. Russell, Northridge, Calif.

[73] Assignee: Automation Industries, Inc., Greenwich, Conn.

[21] Appl. No.: 269,626

[22] Filed: Jun. 2, 1981

[51] Int. Cl.³ .................... G06F 15/46; G05B 19/28
[52] U.S. Cl. .................................. 364/168; 318/573; 318/603; 364/169; 364/474
[58] Field of Search ............... 364/167, 168, 169, 174, 364/474, 475; 318/569, 570, 571, 573, 574, 600, 601, 603, 685, 696

[56] References Cited

U.S. PATENT DOCUMENTS

| 3,372,268 | 3/1968 | Hoernes | 364/169 X |
| 3,428,876 | 2/1969 | Kelling | 364/168 X |
| 3,767,990 | 10/1973 | Kreithen | 318/574 X |
| 3,857,026 | 12/1974 | Mous | 364/169 X |
| 3,878,372 | 4/1975 | Sindelar | 364/174 X |
| 4,042,812 | 8/1977 | Hashimoto et al. | 364/474 X |

Primary Examiner—Joseph F. Ruggiero
Attorney, Agent, or Firm—Francis N. Carten

[57] ABSTRACT

A mechanical element is moved from a first position to a second position along a vector path. Individual step controllers provide drive along each axis at respective velocities for vector movement. The velocity along the greatest distance axis is the master against which acceleration and velocity of the other axes is measured. Optional closed-loop operation insures synchronism of movement along the different axes.

6 Claims, 3 Drawing Figures

MULTI-AXIS CONTROLLER

The present invention relates to an apparatus and method for locating an element at any predetermined position as defined by multiple axes and, more particularly, to such apparatus and method for moving the element from one position to another along a vector path.

BACKGROUND

In the past, the matter of moving a mechanical element from one position to another where the two positions are defined by, say, a set of orthogonal units (x, y, z) has been accomplished serially by first moving to the new x location, then to the new y and finally to the new z. This kind of motion control was practically achieved through the use of servomotors and generators which were accompanied by well-known deficiencies and inaccuracies. Later, more acccuracy was obtained by using so-called step motors which provide a highly precise angular shaft output on being electrically pulsed.

In all known prior motion control apparatus, change in position was not accomplished vectorially, but rather along one axis at a time, namely x1–x2, y1–y2 and z1–z2. This meant that the time allotted for any change in position of a mechanical element was of necessity the summation of the individual times required for moving required amounts on each of the control axes which could be prohibitive.

SUMMARY OF THE PRESENT INVENTION

In the practice of the method of this invention, apparatus is provided for moving a mechanical element from an initial position to a predetermined second position, each position being defined by a set of axes and in which the movement is along a vector joining the two positions. The basic drive for each of the axes is a servo step controller or step motor, which for the situation of a two-axis controller includes two step motors driving the element along the first and second axes, respectively. The requirement of distance or change and direction for each axis is determined with the greatest distance axis being ascribed the "master" to which acceleration and velocity will be related in determining movements along the other axes.

A master division counter corresponding to the maximum distance produces a maximum output frequency (e.g., 40 kHz) for a specific energizing frequency. Counters for the other axes are then ascribed frequencies in accordance with the ratio of the respective axes distance to be traveled to the master distance. That is, the master counter will have the highest frequency and the other counters will be driven by frequencies that are correspondingly less.

Drive of the servo step controllers for the different axes simultaneously by the corresponding counters causes them to stay in synchronism to within a high degree of accuracy. All of the motion parameters are obtained by programming a microcomputer. That is, the distance and direction for each of the axes, acceleration and velocity for the longest moving axis are all obtained in this way.

In order to obtain precise synchronization, relative position feedback information is obtained which provides close-loop adjustment and thereby achieves absolute synchronization. This is accomplished by interpolating through the central processing unit accumulated actual displacements of the mechanical element with computed ones and making any required corrections. Specifically, the master position counter is continuously read, divided by the proper ratios and compared to an axis actual position counter. If the mechanical element is actually ahead of its computed position along any axis, then the axis counter output frequency is decreased in order to make drive along the axis slower. If behind, the driving frequency is increased.

To generate a ramped pulse train for achieving acceleration, the processor periodically increments the rate generator a fixed amount (dv) and by making the period a programmable variable (dt), acceleration is derived by the ratio dv/dt. By use of a lookup table the acceleration parameter is converted to a constant which is loaded into an acceleration timer. When this timer interrupts processor operation, the processing unit checks to determine if it must either increment the rate generator (accelerate), decrement the rate generator (decelerate) or disable the timer, the latter being accomplished only when operation is at cruising velocity.

On a start command being written to the apparatus, the direction acceleration timer is initiated and ramp up status is accordingly reflected. At this time, half of the farthest distance (i.e., master distance) is loaded into an alarm comparator interconnected with the master position counter. When the comparator interrupts, the processor mode will change from the current condition to the ramp down mode. If there is a sufficient distance to allow the apparatus to ramp up to its maximum program velocity (cruising velocity), thee processsor will subtract the distance required to ramp up from the total distance and reload this amount into the alarm comparator. This distance value is the position at which the ramp down must begin. When each axis position counter reaches its final count or distance, an interrupt is generated to disable them and signal a completed movement.

A further aspect of the present invention is that multiple apparatus of the kind described may be synchronized to provide control of a maximum of as many as 48 axes by the use of a common velocity clock.

DESCRIPTION OF PREFERRED EMBODIMENTS

Figure 1:
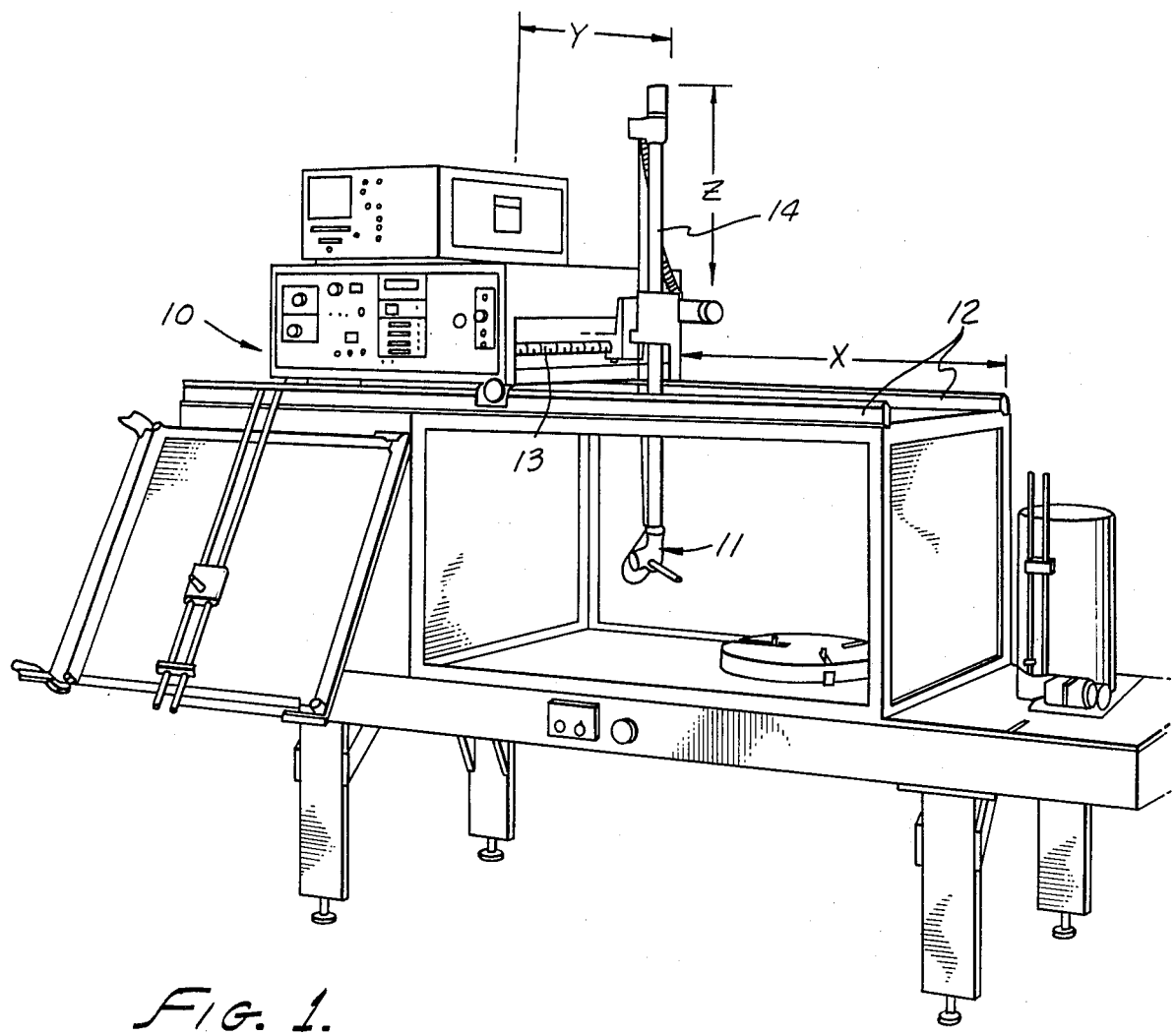
FIG. 1 is a perspective view of one form of apparatus for practicing the method of the present invention.
Figure 2:
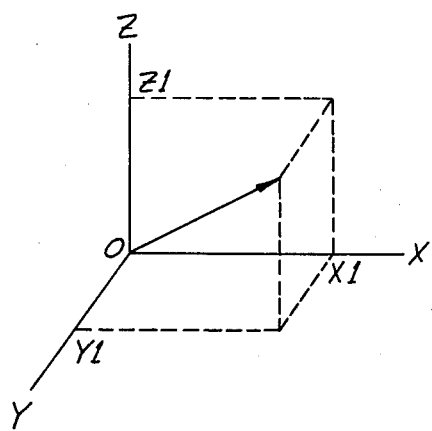
FIG. 2 is a schematic depiction of an orthogonal, three axis system.

With reference now to the drawing and particularly FIGS. 1 and 2, the apparatus of this invention is identified generally as at 10 and is seen to include a mechanical element 11 which it is desired to move to a new location involving change along the x, y and z axes. For this purpose and in a way that will be described the element 11 is driven along a pair of racks 12 defined as the x direction, and along a thread shaft 13 arranged at 90 degrees to rack 12 to define the y direction. Driving motion along shaft 14 which is orthogonal to both rack 12 and thread shaft 13 establishes the z direction.

With particular reference to FIG. 2, it is clear that in order to accomplish one of the primary desiderata of this invention, namely, the vectoring movement from, say, the point 0 to x1, y1, z1 that the movements in the respective directions must be at different velocities or rates in accordance with the respective distances to travel. That is, the distance y1 is greater than either x1 or z1, so that to make a vector movement, it is necessary that the component movements in the x, y and z axes all be accomplished in the same period of time. This is accomplished generally here by providing separate and adjustable speed driving means for each axis, with driving speed of each being selected in accordance with the distance required to be traveled along that axis. Thus, in the example shown in FIG. 2, the y1 distance is greatest therefore the y drive for vectoring movement must be the fastest and the x and z drives being correspondingly slower.

MULTIAXIS DRIVE SIGNAL GENERATION

Figure 3:
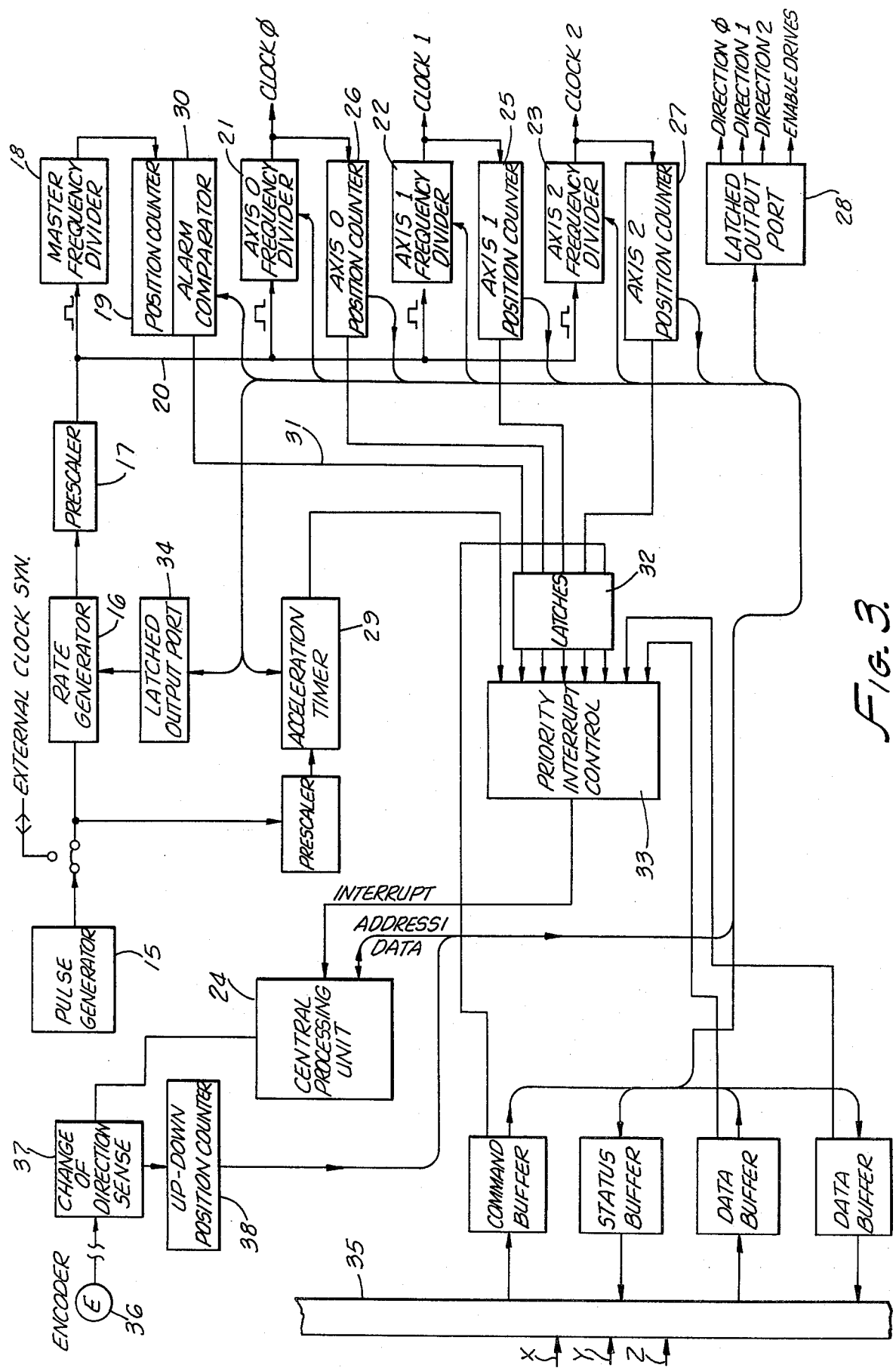
FIG. 3 is a function block diagram of the circuit apparatus of this invention.

The basic drive means relied upon to position the mechanical element along each axis is a so-called step controller (not shown) which rotates its output or drive shaft a precise angular amount for each electrical pulse presented to its energizing terminals. Turning now to FIG. 3, the fundamental source for the drive pulses is pulse generator 15 which in a practical embodiment provides a pulse train having a frequency of 22 MHz. The pulses pass through a rate generator 16 the operation of which will be described later, after which the pulse frequency is divided by a fixed amount (e.g., 3) in a prescaler 17. Next, the prescaled pulse train is once more divided in a master frequency divider 18 by the fixed amount 183 which provides a maximum frequency input to the master position counter 19 of 40 KHz.

In a similaar manner, the prescaled pulse is fed along lead 20 to energize axis 0 frequency divider 21, axis 1 frequency divider 22 and axis 2 frequency divider 23. Each of the frequency dividers is adjusted by data from the central processing unit 24 to provide a pulse frequency in the same ratio to the master frequency as the ratio of the corresponding axis distance to the largest axis distance (master).

In accordance with initial programming, the various axes are allotted x, y and z coordinate designations. For purposes of the present description, it is assumed that axis 0 is the x-axis, axis 1 is the y-axis and axis 2 is the z-axis. Accordingly, axis 1 frequency dividers will be identical in frequency to the master (i.e., 40 KHz) and it will provide the fastest rate pulses to the step controller driving in the y direction, which pulses will also be stored in the axis 1 position counter 24. The axis 0 and axis 2 dividers will, in turn, provide pulses at respective rates proportional to the ratio of change along each axis to the master axis. Pulses from dividers 21 and 23 are individually stored in position counters 26 and 27 and drive step controllers to position in the x and z directions.

Also the central processor provides via a latched output port 28 signals for driving the various step controllers in the correct direction. Still further, a threshold signal Enable Drive is provided to the step controllers through the same port.

CLOSED-LOOP SYNCHRONIZATION

The open-loop operation just described will provide synchronized positioning along multiple axes accurate to within approximately 0.5%. Under certain circumstances greater accuracy is required and this is accomplished here by a closed-loop operation which will be described at this time.

Essentially, the philosophy employed is to compare a computed intermediate coordinate position along a selected axis with its actual position and then increase or decrease the drive rate of the step controller for that particular axis, as required, to bring the computed and actual values into agreement.

This is accomplished by continuously reading out the accumulated value in the master coordinate axis counter, which in our present example is axis 1 position counter 25, and storing this value in the memory of the central processing unit 24. Thelast stored value from 25 is multiplied by the ratio of the total coordinate change to be made along axis 0 to the total coordinate change to be made along master axis 1 which is the computed value of where the mechanical element 11 should be at that moment, assuming the master axis positioning to be accurate. The computed value of axis 1 position is stored in the computer memory.

The count value accumulated in the axis 0 position counter 26 is then read out and temporarily stored in the computer, which value is representative of the actual position of the element 11 along axis 0.

Comparison of the computed value and actual value of the mechanical element with respect to axis 0 is then made with a resulting determination of whether the actual position of the element 11 is ahead or behind of its computed position. As a result of this determination, the axis 0 frequency divider 21 is commanded by the computer to increase or decrease, as the case may be. By conducting the described closed-loop comparisons on a continuous basis, the highest degree of positioning accuracy is obtained.

Axis 2 may also be tested in the same manner and corrected as needed.

ACCELERATION AND DECELERATION

Since the drive system includes gears, shafts, mechanical element 11, and anything carried by element 11 which, of necessity, entails a substantial amount of mass, it is advisable that special steps be taken to obviate the expected adverse effects of inertia. These steps include accelerating drive at the start to compensate for standing inertia, and decelerating drive as the element 11 approaches its new position to prevent overshoot.

On start of operation, the acceleration timer 29 is enabled by the central processing unit and a ramp-up condition is reflected. At this same time, one-half of the master distance (i.e., longest axis change to be made) in position counter 19 is loaded into alarm comparator 30. When one-half the master axis distance is achieved the comparator 30 sends a signal along 31 through an appropriate control latch 32 and priority interrupt control 33 to the processor 24 causing a change to the ramp-down mode.

The rate generator 16 is selectively actuatable by a signal from latched output port 34 to provide either (a) a pulse train of increasing frequency (ramp-up), (b) a pulse train of decreasing frequency (ramp-down), or (c) constant frequency pulses (cruising velocity). In the manner described in the immediately preceding paragraph, the rate generator 16 presents a ramp-up condition for the first half of the distance to be traversed so that the various step controllers accelerate during this phase. On interruption at the half-way point the rate generator is switched to the ramp-down mode so that the step controllers will decelerate thereby preventing overshoot.

For those situations where the repositioning distance is sufficiently large, the ramp-up condition will maintain until the maximum programmed velocity is achieved (so-called cruising velocity). The processor will automatically subtract the distance required for ramp-up from the total master distance and reload this value in the alarm comparator 30. That is, the alarm comparator will now generate an interrupt signal at the point at which ramp-down must start.

When the final position is reached by mechanical element 11, a further interrupt is generated and the step controllers are all stopped.

With respect to the processor manner of generating a frequency pulse train, the processor increments the rate generator 16 a fixed amount dv for a period which is a programmable variable dt. The acceleration so derived, a=dv/dt is converted to a constant via a stored look-up table, which constant is loaded into acceleration timer 29. On interruption by the timer 29, the processor unit 24 commands the rate generator 16 to ramp-up, ramp-down or cruising velocity operation, and for the latter to disable timer 29 during that period.

In a practical construction of the invention, the following commercially available circuit apparatus were utilized for the indicated items:

pulse generator 15—Part Ser. No. 74S04 Texas Instruments Dallas, Tex.
rate generator 16—Part Ser. No. 7497 Texas Instruments Dallas, Tex.
prescaler 17—Part Ser. No. 74S163 frequency divider 18—Part Ser. No. AM 9513; position counter 19; Advanced Micro Devices; frequency dividers 21, 22, 23; position counters 25, 26, 27; alarm comparator 30
central processing unit 24—Model P8085A Intel Corporation
latched output port 28—Model P8255A-5, Intel Corporation
acceleration timer 29—Model P8155 Intel Corporation
control latch 32—Part Ser. No. 74LS74, Texas Instruments, Dallas, Tex.
priority interrupt control 33—Model P8359A, Intel Corporation A practical construction of the system of this invention was operated and accomplished the various functions described herein under control of the following program listing:

```
:04000000F3C36000E6
:02002400F3C91E
:02002C00FBC90E
:02003400FBC906
:03003C00C3B90570
:030040000C33003C7
:10004400FBC3DD04FBC3B804FBC3FD04FBC31905F8
:100054000FBC33505FBC35905FBC3760031FF603E86
:10006400DF30CD6D02D3173A9460B7C20501760C371
:100074006900E5D5C5F53EFF329560D314FBDB5A24
:100084004FE640CAB60079E630CAB6003EA3D34173
:1000940079E620C2BE002A00587CE60FC2A9007D82
:1000A400FE02DAB0002B22005BC3B60079E602C2B1
:1000B4001102F3AF329560C34A062A005823220086
:1000C40058EB2A02607BBDC2B6007AE60FBCC2B60A
:1000D400003EC2D349CD30063E0AD35B3E19D3411C
:1000E40021004011 6960CDC3051105602169600ECE
:1000F40003CD1A06116960CD5607AF329560C3541B
:100104000063E02320060 4F3A4F60070DF20E01D2F4
:100114003B01210003922796 03A00604FCDD301C0
:100124000F33A4F60F608324F60FBCD4501F33A4F86
:1001340060E6F7324F60FB3A00603DFA0501C30701
:100144001110402A476036B8EB36A336192B114A
:10015400116 0CDC8050154601111 60CD100E2A4DF7
:1001640060EBCD9C0E11706 0CD000D2A4760361CEB
:100174002BEB2A7E60EBCDC8052A7E6023232311 56
:1001840007360CDEA05C8DAB5012A77607E17DB7E9B
:100194001FDA9E017EF680C39F01AFF3772A4B607E
:1001A4005E235613722B732A4760360B2B7372FB34
:1001B400C92A77607E1FD87E17DAC6017EF601C3BE
:1001C400C701AFF3772A4B605E23561BC3A80121F6
:1001D40004011 0008410DFAE401190DFAE4011977
:1001E4002249602324760581600 21746 01922773F
:1001F4060EB113D6029EB19224B60EB29EB211 5D3
:100204006019227E6021216019224D60C9210000FD
:1002140020058CD30063EC6D3493EC4D341D35103
:100224003A4F60E617324F60DB5AE602C23F022FB4
:10023400329660CDF8063E1FC34402CDE0063E6F01
:10024400329360F33E20D3003A9560B7CA5B023E16
```

```
:10025400200300AF32956031FF60216900AF329442
:10026400600DB5AE68DD35AFBE92101600EFCAF77BF
:100274002300C273023E38D3603E80D35B113B042E
:100284002101400CD1303210148CD1303210150CD99
:1002940013033E403011B900210148360928737213
:1002A40001000021546005CDF20F212D607323720B
:1002B4002336002336000154600112D60CD100ECD7D
:1002C4002C10219901220260210100220560220800C
:1002D40060220B60220E607D329860329960329AFF
:1002E400603E10320460CD77063E1F329360D31017
:1002F400D311D312D313D314D315D3163E56D3002C
:100304000AFD3012FD3013E20D300AFD301FBC936B5
:10031400FF365F3617CD27030E0571CD27030DC2B7
:100324001E03C92B1A77131A771323C9E5D5C5F50C
:100334003EB8D341D349D351DB62B7FA04044FE644
:100344000F325360577907070A950A070AA90807C5
:100354000D2EE0307DAF9033A9360E620C236043A90
:1003640000160AA3201603A0160CD68063E0832930A
:10037400603A5360E607CA36040F0F0F4F3A4F60D6
:10038400B1324F601600174FD29E033A9860B7CA35
:100394009E037AF680573E64D34179174FD2B30354

:1003A4003A9960B7CAB3037AF640573E64D34979A1
:1003B40017D2C7033A9A60B7CAC7037AF620573EE2
:1003C40064D3517A329760B7CA4806DB5AF660D3D1
:1003D4005A3A4F60E61FB2324F603EFF3294602FAC
:1003E4003296603E63D349C348063A9360E640C2FE
:1003F4003604C36A033A9360E610C23604C36A0340
:10040400707DA6000DB5A4FE640CA290479E62080
:1004140C22C0479E620C225043E09D35B3E62D394
:10042400493E03D35BC348063E0AD35BCD3006C3C3
:100434001D043E04C339060C10211021003210321A0
:10044400102100102110210021032105210300A5
:10045400010211021002100000000000078003C005E
:10046400280010E0018001425110000F550D000CE97A
:100474000A0000A3B099208000880070F07AB0651DF
:10048400061B06B705740530050005CD049D0472E6
:100494000044904230400040F03C003A30387036E99
:1004A400035503303E0328031403000300000000067
:1004B40000000000E5D5C5F5D3163A6660B7CAD684
:1004C40043D3266602A67607ED31823226760C3C6
:1004D40048063E04D35BC34806E5D5C5F5DB612A6F
:1004E40050607723225060 3A5260 3D325260C2480D5
:1004F400063E06D35B2A9160E9F53A4F60E680CA6E
:1005040053053EC4D341F33A4F60E67F324F60FB5C
:10051400D310C34E05F53A4F60E640CA53053EC4B6
:10052400D349F33A4F60E6BF324F60FBD311C34E59
:1005340005F53A4F60E620CA53053EC4D351F33A59
:100544004F60E6DF324F60FBD312E6E0CA11023E91
:100554002D300F1C9C5F5D313DB5A4FE610C2828C
:100564000579E640CA820579E620CA770579E6DFBF
:10057400C3780579F610D35A3E62D349D3143E208A
:10058400D300F1C1C9E5D5C5F521015036D83A4F9C
:1005940060E610C2A50579F610324F603E50C3AD37
:1005A40000579E6EF324F603E2036042B7723360578
:1005B4002B7723363836F636F6F1C1D1E1FBC90E76
:1005C40003C3CA050E047E12130DC2CA05C90E0266
:1005D400C3D9050E031A77130DC2D905C91A7713A7
```

```
:1005E400230DC2E105C90E041A4796C2F9052B1B57
:1005F4000DC8C3EC050DC20306FE01C8FEFFC87892
:10060400960906031A771323050208063600C97E65
:100614001223137E12C9AF1A9E77231300DC21B0431
:100624000921014036012B3621D313C921014036 9B
:100634000 12B3620C94F3A4F60B1324F603E01D38F
:10064400 5BC34A06D3173E20D300F1C1D1E1FBC9F5
:100654003A4F60E608CA4A062A7960F93E20D30078
:10066400FBC32E01320160 0F0F0F4FDB59E61FB1A0
:10067400D359C9CD3307118D60210760CD4B07CD08
:100684007607015460CDAA07CDC307CDDC07CDF5AD
:100694007 07CD0308CD1108CD1F08CD2808CD31089A
:1006A400210140360920B110560CDD20523360A2BD2
:1006B4001A77AF77233663360928777723360A2BDD
:1006C4007777EB2A05607CB5C0EB2336012B3620FF
:1006D4002336F1360120B36202336F1C921014036 9
:1006E400A3361920B11160CDC305116B6021360 2
:1006F400CD4B07C9CDA4063A9760173297600D20B49
:100704 07CDF507CD1F083A9760173297600D21BC3
:100714000 07CD0308CD28083A9760170D2807CD11D2
:1007240008CD310BAF329760118B60CD5607C93AB6
:10073400046 0875F1600215F0419EB21014836 A23
:100744002B1A77131A77C9AFCDA308CDA308CDA36D
:10075400 08132100001 97EB7C2670723BEC26707CA
:100764002 3BECB21014036072BCDD7053600CD2541
:10077400 06C91105602170 60CD0606015460117030
:100 78400 60CD100E116C60CD2C1011086021216019

:10079400CD8808110B60212560CD8808110E6021D9
:1007A40002960CD8808C9112D60CDB50D112160CD0A
:1007B400A90B113160CD000DEB113D60C31306117F
:1007C4002D60CDB50D112560CDA90B113560CD007F
:1007D40000DEB113F60C31306112D60CDB50D11292A
:1007E40060CDA90B113960CD000DEB114160C31320
:1007F40063E0BD34121004 113D60CDD205C93ED8
:100804 00BD34921004 8113F60CDD205C93E0BD31B
:100814005121005 114160CDD205C9110860210158
:1008240040 C33708110B60210148C33708110E601B
:100834 0210150D5360C2BCDD20523360D2B1A773A
:100844 0AF771323367836E5360 C2B777723360DBE
:100854002B77772336052B362923 36F536F53605DF
:100864002B36212336F536F5EBE17E23B6C0EB36B5
:1008740042B36292336F436F436042B362123365A
:10088400F436F4C9E5217060CD0606117060015498
:10089400 60CD100E116C60CDA90BD1CD2C10C97E8A
:1008A4001F121B2BC9DB5AE608C236043A53604FA9
:1008B400E608C2DF0879B7CA0E093DCA19093DCA5C
:1008C40024093DCA2F093DCA3A093DCA45093DCA12
:1008D40050093DCA5B093E03C33906790FDA03099F
:1008E40000FDAFA080FDAF1080E03C339062108609B
:1008F40011D809C30909210B6011100AC309092180
:100904000E6011480A3E03C36309210160117C098A
:100914003E10C36309210260118409 3E02C36309C6
:10092400210460118709 3E01C36309218E60118A85
:10093400093E03C36309217C60118B09 3E02C36332
:1009440092 17B60118C09 3E01C36309218960116F
:100954 090093E02C363092 10560 11AF 093E0322D9
```

```
:10096400506DEB2291603252603E07D35B3A936051
:10097400F680329360C34806CD77063E3F329360DB
:10098400C34806CD3307000000C34806EC0302AE2
:100994008960CB7C2A5097D2F6F3A0160A5C3A900
:1009A400093A0160B5CD6806C34806CDA406118D89
:1009B40060210760CD4B07CD7607CDAA07CDC307CD
:1009C400CDDC07CDF507CD0308CD11083E1F3293CA
:1009D40060C34806210A60CD850AB7FAEE09CA0740
:1009E4000A3A98603DCAF4093E01329860CD1F0866
:1009F40011086021216CD8808015460CDAA07CD7B
:100A0400F507C37D0AAF329860C37D0A210D60CD1E
:100A1400850AB7FA260ACA410A3A99603DCA2C0ADD
:100A24003E01329960CD28081 10B60212560CD88E4
:100A340008015460CDC307CD0308C37D0AAF3299C2
:100A440060C37D0A211060CD850AB7FA5E0ACA79AF
:100A540000A3A9A603DCA640A3E01329A60CD31086E
:100A6400110E60212960CD8808015460CDDC07CDCA
:100A740011808C37D0AAF329A603E1F329360C348A7
:100A8400067E2BB63EFFC02B7EB7C8FE01C83EFFD4
:100A9400C907DA360BDB5AE604CAA50A3E05C33990
:100AA400063E05D35B3A53604FE60BC2CC0A79B7D9
:100AB400CAF70A3DCA0C0B3DCA1E0B3DCA300B3E99
:100AC40004D35B3E03C33906790FDAE50A0FDADF94
:100AD4000A0FD2C30A211560C3E80A211960C3E8CA
:100AE4000A211D607ED318232267603E02326660AD
:100AF400C34806F33A4F60D318E6F8324F60FBAFB1
:100B0400D35B326660C34806210058 7ED318232283
:100B140067603E01326660C348062101607ED318D7
:100B2400232267603E11326660C34806211160C308
:100B3400E80A3E1CD341D349D351 1 18060AF3266D9
:100B4400603A53601F1F1F47D25E0B210040CDC384
:100B540053A6660C603326660781747D2720B2185
:100B64000048CDC3053A6660C603326607817D282
:100B7400840B210050CDC3053A6660C60332666018

:100BB4003A9660B7CA910B21AF04C3940B218060DD
:100BC4007E23226760D318216660352103583605089
:100BA400D317C35406F5E5CD5010FE02CACF0BDAB5
:100BB400ECOCFE03C2BE0BC3FD0C0AF601E6F902FF
:100BC400210300097EF61077C3EC0CD5C5E57C2122
:100BD40011000986772B7EF52B7E2B462B4EE521C3
:100BE4000200E5E5210100E5EB5E2356F5237EF6E0
:100BF400080696047F1373FE5F5F54F7D936F7C9A47
:100C0400677998D21B0C4FF179DA1D0CF1E1E329D5
:100C1400DA2D0CE3C3280C333333333333E3292382
:100C2400DA2D0CE3298FC3FB0BE33B3BE5F5210AEB
:100C340000397E3DCA4D0C2B2B772B2B2B36002BEA
:100C4400367FF1E1298FC3FB0B0E20F1E1B7C261BE
:100C540000C7CB7C2610C7DB7C2610C0E00E1E1D11E
:100C6400600292929292929297A17DA7F0C0601295E
:100C7400EBDA7C0C29C37E0C2923EB7DB16C634A2F
:100C8400CD2F12EBE1E1E17323722371234F3E7FF9
:100C9400081904 7F1804F0601DAA10C0600D17993C7
:100CA4005F78DAB50CB7C2DB0C7BB7CAC80CC3BF1C
:100CB4000CB7CAC80C7BFEFFCADB0C77C13E10021E
:100CC400D1E1F1C97BC6BE77C1210300097EF620BC
:100CD400773E1402C3EB0C7BDEBE77C1210300090F
```

```
:100CE4007EF640773E1302D1C5C521FC0CE5030A0C
:100CF4006F030A67010400E9C1E1F1C9F5E5C5D54F
:100D04000AE617FE15CAA00D211100097EF52B7EF7
:100D1400FE7FDA750D2B462B4E2B561E00FE9ECA07
:100D240056ODD28CODD67F6F3E1F956F97781F4755
:100D3400791F4F7A1F577B1F5F2DC2300DF1B7CA41
:100D44007C0D97935F3E009A573E00994F3E009862
:100D540047C37C0DF1B7CA8D0D78FE80C28D0D7925
:100D6400B7C28D0D7AB7C28D0D7BB7C28D0DC37C12
:100D74000D010000110000F1E17323722371237O4F
:100D84002B2B2BEBC1E1F1C9F1D1C1C5C53E130237
:100D94000303030AF640020B0BC3A50DD1C1C5C55D
:100DA400030A6F030A6701B20DC5010500E9C38B90
:100DB4000DE5F5D5210D00091A7723131A772313AE
:100DC4001AF680771A1713231A1777F5231AE68071
:100DD40077F1B7CAE60DFEFFCA030E3E1002D1F149
:100DE400E1C92B2B7EE67F77232397BEC2030E2B0C
:100DF4002BBEC2030E2BBEC2030E2BBECAE10D21B5
:100E0400003000097EF680773E15C3E10DF5E5D5C5EF
:100E140021110009E5EB5E2356234E23467BB7C21E
:100E24004B0E7AB7C24B0E79B7C24B0E78FEB0CA0E
:100E3400430EB7C24B0EC1C1D1CDCB10C3990E3EE8
:100E44008048069EC38A0E7BE6B0F5CA610E9793A1
:100E54005F3E009A573E00994F3E009847EB1E00B4
:100E640029798F4F7B8F471C17D2640E556C614BCF
:100E74007AE61F7ACA7F0EE6E0F620CD2F12573E9F
:100E84009E9382EB47F1E1772B702B712B722B73BE
:100E9400C13E1002D1E1F1C9F5E5CD5010FE02CA00
:100EA400B40EDADC0FFE05C2EF0FCDCB10C3EF0F8B
:100EB400D5C5E57C2111000986772B4E0600E32673
:100EC400000923E32B462B4E2B7EE5EB5F23237EB9
:100ED400F68057D52B562B5E210000CDCF11E5F5BA
:100EE4002100007ACDCF11E5F5210007BCDCF1193
:100EF400E5F5210C00397E23464A57210000CDCF69
:100F040011E5F5210000006004B7ACDCF117D0E804E
:100F1400B7C21A0F0E006C2600F1D119CE0047D2C9
:100F2400270F0CF1D11988D22F0F0C477D6C60B7B5
:100F3400CA3B0F79F6804FF1D119CE0047D2480F42
:100F440079F6404FF1D1E56C6019CE004779E63F60
:100F5400846778CE00D1414F78E640CA630F0C789D
:100F64001F1FE620B35FE63F7BCA740FE6E0F6205E

:100F74005F79E6807B0600C2830F0601CD0F12CD98
:100F84002F12EBE1E1732372237123D14F3E7F8053
:100F940091477B905FC13E10027ADAAD0FB7C2CCA5
:100FA4000F7BB7CABB0FC3B70FB7CABB0F7BFEFF1C
:100FB400CACC0F73C3EE0F7BC6BE77210300097E34
:100FC400F620773E14C3DA0F7BDEBE77210300090D7
:100FD4007EF640773E1302D1D5C5C521ED0FE5035A
:100FE4000A6F030A67010300E9C1D1E1F1C9F5E51C
:100FF400D5C5210800394E2346235E2356702B7134
:10100400C12111001916003E0E722B3DC20D107144
:101014002B78E601D1D5C2201011E110722B732B6D
:101024003600D1E1F13333C9F5E5D5210D00097E50
```

```
:101034001213237E121323237E1F2B7E170F1213EA
:10104400232237E172B7E1F12D1E1F1C90AE617FE76
:1010540015CAB610210200197E17237E172600D266
:101064006B102680B7CA9710FEFFCAB9106FE5262C
:10107400010AE6107CCA8910B7CA84103E02E1C98D
:1010B4003E05C3B210B7CA92103E03C3B2103E04C9
:10109400C38210210300193E00BEC2B9102BBEC288
:1010A400B9102BBEC2B9102BBEC2B9102600E5C3BD
:1010B400751O3E01C90303030AF680020B0B0B0AE9
:1010C400E616F6060297C9F5E5D5970221110O093F
:1010D400573E0D722B3DC2D710D1E1F1C9F5C5E5DC
:1010E40079D5210800395E2356234E2346722B73BB
:1010F400D1FE01CA1B11FE02CA1B11FE03CA1B1139
:10110400FE04CA1B11FE05CA6311FE06CA8F11FE36
:101114000ACA1B11C3C9110AE607FE01CA3511FE2A
:10112400002CA3511FE03CA4811FE04CA5D11C3C9BF
:10113400112180FFE5210000E539EBCDB50DEBE110
:10114400E1C3C91121100009336FE2B36FF2B36FFEF
:101154002B36FF3E1002C3C911CDCB10C3C9110AEF
:1O116400E607FE03C2C9113E1002211100097EB731
:101174003E00C27B113EFF121312131 2137EB7C23C
:10118400B8113E7F121B1B1BC3C9110AE61F02E60E
:1O11940007FE06CAC911D5210D00091ABEC2C8111D
:1011A4001323 1ABEC2C8111323EB131A1F1B1A17D9
:1011B4000FBEC2C8112313131A171B1A1FBEC2C8AD
:1011C400113E9502D1E1C1F13333C917D2D61109C9
:1011D400CE002917D2DE1109CE002917D2E6110953
:1011E400CE002917D2EE1109CE002917D2F6110923
:1011F400CE002917D2FE1109CE002917D2061209F2
:10120400CE002917D20E1209CE00C90600577917D
:101214007AD8E6C05F7B175F7D176F7C17677917F5
:101224004F0417D219127AE620B3C9C6B0577DCE6F
:1012340006F7CCE006779CE004FDA4C127AB7C2C9
:01D1244004A127DE6FE6F97C90EB03E01C97B
:000060019F
```

In the preceding description, the manner of entering the positional data (e.g., x1, y1, z1) has not been discussed. It is contemplated that a common method of entry will be made via a peripheral (e.g., keyboard) to a data bus 35, which is shown by the three arrows also identified by the letters x, y and z. Optionally, the positional data may be entered into the system via a shaft encoder 36 which through a circuit 37 provides a direct input into the central processing unit 24 of both the amount of positional coordinate change and the direction thereof. This same information is entered into an up-down counter 38 and then to latch 32 for use in generating a termination of movement interrupt signal when the desired position is reached by the mechanical element.

I claim:

1. A system for moving a mechanical element along a vector path from a first position to a second position, said positions being defined by coordinates on at least two axes, comprising:

selectively actuatable means for storing the coordinates of said first and second positions and for producing electric signals representative of the differences of the two coordinates on each axis;

first means responsive to pulse energization for moving the mechanical element parallel to that axis along which there is a greater coordinate change on moving from the first position to the second position;

second means responsive to pulse energization for moving the mechanical element along a path parallel to the other axis;

a source of pulses of a first frequency interconnected with the first moving means;

a second source of pulses having a frequency equal to that of the first frequency multiplied by the ratio of the shorter coordinate change to the longer coordinate change;

first and second counters interconnected with the respective first and second pulse sources for accumulating pulse counts corresponding to the change along the two axes on moving from the first to the second position;

means for storing temporarily intermediate pulse counts of said first counter;

means for multiplying the temporarily stored pulse count in the first counter by the ratio of the shorter axis coordinate change in moving from the first to the second positions to the longer axis coordinate change;

means for comparing the ratioed value of the temporarily stored pulse count with the intermediate stored pulse count in said second counter and forming an error signal; and means responsive to the error signal for modifying the second source pulse frequency in such direction as to make the error signal zero to terminate accumulation of the counters on coincidence of the respective stored coordinates and the accumulated coordinates in the counters.

2. A system for moving a mechanical element as in claim 1, in which the selectively actuatable means and comparator are a digital computer.

3. A system for moving a mechanical element as in claim 1, in which said first and second means responsive to pulse energization include step controllers for producing a predetermined amount of mechanical movement in response to electric pulse energization.

4. A system as in claim 1, in which the means for temporarily storing intermediate pulse counts of said first and second counters, multiplying means, further comparing means, and means for modifying the second source pulse frequency include a digital computer.

5. A system for moving a mechanical element along a vector path from a first position to a second position, said positions being defined by coordinates on at least two axes, comprising:

selectively actuatable means for storing the coordinates of said first and second positions and for producing electric signals representative of the differences of the two coordinates on each axis;

first means responsive to pulse energization for moving the mechanical element parallel to that axis along which there is a greater coordinate change on moving from the first position to the second position;

second means responsive to pulse energization for moving the mechanical element along a path parallel to the other axis;

a source of pulses of a first frequency interconnected with the first moving means;

a second source of pulses having a frequency equal to that of the first frequency multiplied by the ratio of the shorter coordinate change to the longer coordinate change;

first and second counters interconnected with the respective first and second pulse sources for accumulating pulse counts corresponding to the change along the two axes on moving from the first to the second position;

actuatable means interconnectedd with said first and second sources of pulses for selectively modifying the pulse output of each to a pulse train of increasing frequency, or a constant frequency pulse train;

means for actuating said means interconnected with the first and second pulse sources for actuating an increasing frequency pulse train on initiation of system operation, for actuating reducing frequency pulse trains a predetermined position prior to termination of mechanical element movement, and for actuating constant frequency pulse trains a predetermined time period after initiation of system operation; and a comparator interconnected to the first and second counters and the storing means to terminate accumulation of the counters on coincidence of the respective stored coordinates and the accumulated coordinates in the counters.

6. A system as in claim 4, in which on initiation of system operation pulse trains of increasing frequency are actuated, a timer is enabled and one-half of the greatest coordinate axis distance change is loaded into an alarm comparator, said alarm comparator being energized on said one-half of greatest coordinate axis distance change being achieved to actuate said selectively actuatable means to provide pulse trains of decreasing frequency.

* * * * *